United States Patent
Appel et al.

(10) Patent No.: US 8,482,941 B2
(45) Date of Patent: Jul. 9, 2013

(54) METHOD FOR OPERATING A SWITCHED MODE POWER SUPPLY WITH RETURN OF PRIMARY-SIDE STRAY ENERGY

(75) Inventors: Wilhelm Appel, Laa a.d. Thaya (AT); Wolfgang Peprny, Vienna (AT); Arnold Schönleitner, Vienna (AT)

(73) Assignee: Siemens Aktiengesellschaft, München (DE)

( * ) Notice: Subject to any disclaimer, the term of this patent is extended or adjusted under 35 U.S.C. 154(b) by 1110 days.

(21) Appl. No.: 11/887,864

(22) PCT Filed: Mar. 21, 2006

(86) PCT No.: PCT/EP2006/060906
§ 371 (c)(1),
(2), (4) Date: Dec. 19, 2008

(87) PCT Pub. No.: WO2006/106040
PCT Pub. Date: Oct. 12, 2006

(65) Prior Publication Data
US 2009/0175054 A1    Jul. 9, 2009

(51) Int. Cl.
*H02M 3/335* (2006.01)
*H02M 3/338* (2006.01)

(52) U.S. Cl.
USPC .................................. 363/21.15; 363/21.17

(58) Field of Classification Search
USPC ........... 363/21.12, 21.14, 21.15, 21.17, 21.18
See application file for complete search history.

(56) References Cited

U.S. PATENT DOCUMENTS

| | | | |
|---|---|---|---|
| 4,754,385 A | 6/1988 | McDade et al. | |
| 5,402,330 A * | 3/1995 | Megeid | 363/21.16 |
| 5,909,361 A * | 6/1999 | Kim | 363/21.16 |
| 5,909,363 A * | 6/1999 | Yoon | 363/21.16 |
| 6,069,800 A | 5/2000 | Cross et al. | |
| 7,248,486 B2 * | 7/2007 | Schonleitner et al. | 363/21.04 |
| 7,365,996 B2 * | 4/2008 | Schonleitner et al. | 363/20 |

FOREIGN PATENT DOCUMENTS

| | | |
|---|---|---|
| DE | 3537536 A1 | 4/1987 |
| EP | 0 570 704 A2 | 11/1993 |
| JP | 60148374 A | 8/1985 |
| JP | 11098832 A | 4/1999 |
| SU | 1746492 A1 | 7/1992 |
| SU | 1823101 A1 | 6/1993 |

OTHER PUBLICATIONS

Lloyd H. Dixon, "Transformer and Inductor Design for Optimum Circuit Performance", Texas Instruments Incorporated; Dallas, TX, 2003, pp. 4-1 to 4-28, 1.
Ron Young, "Stromversorgung für SLICs", Telecom & Elektronik, Jan. 2001; pp. 27-28, 30-31, 416.

* cited by examiner

*Primary Examiner* — Adolf Berhane
*Assistant Examiner* — Nusrat Quddus

(57) ABSTRACT

The invention relates to a method for operating a switched mode power supply as an isolating transformer. According to said method, magnetic energy is stored in the core of a transformer during a storage stage via a primary coil that is connected to an intermediate circuit current and the stored magnetic energy is delivered to a load in a subsequent discharge phase, for the most part by means of a secondary coil, a small part of said magnetic energy being discharged on the primary side. The energy that is discharged on the primary side charges a capacitor in such a way that the capacitor current is always held above the secondary current multiplied by the transmittance ratio of the transformer.

9 Claims, 4 Drawing Sheets

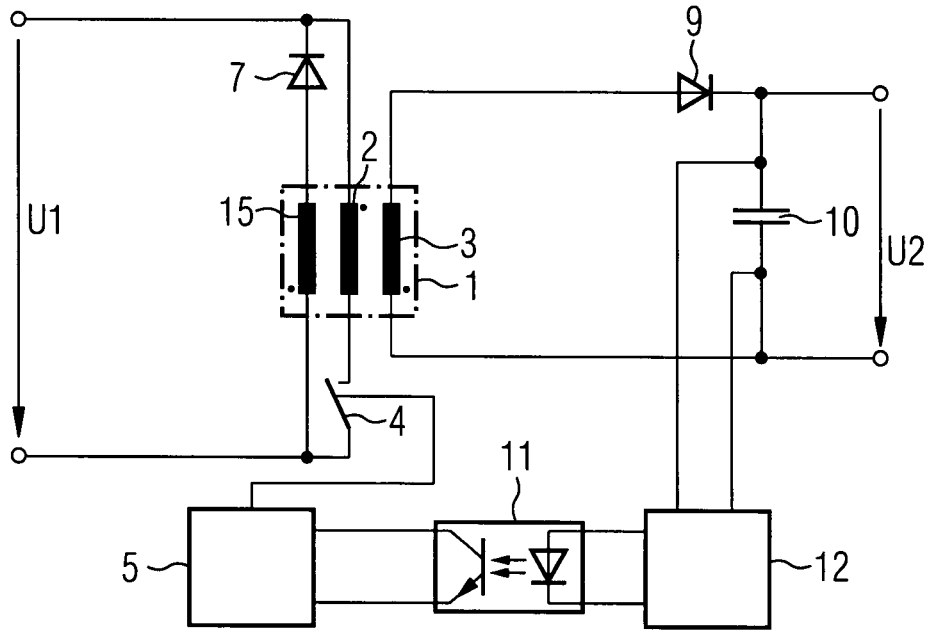
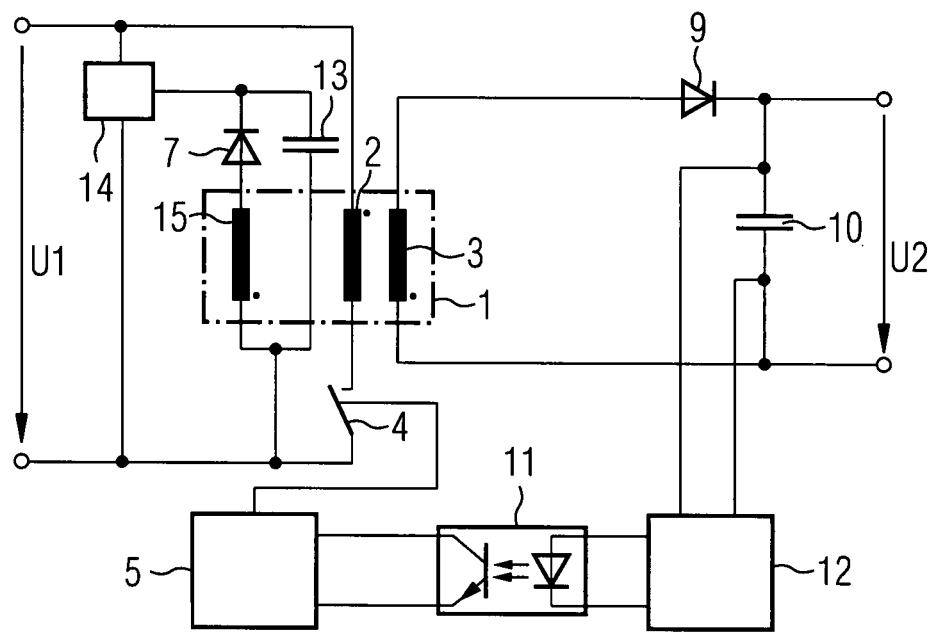

METHOD FOR OPERATING A SWITCHED MODE POWER SUPPLY WITH RETURN OF PRIMARY-SIDE STRAY ENERGY

CROSS REFERENCE TO RELATED APPLICATIONS

This application is the U.S. National Stage of International Application No. PCT/EP2006/060906, filed Mar. 21, 2006 and claims the benefit thereof. The International Application claims the benefits of German application No. 10 2005 016 285.1 filed Apr. 8, 2005, both of the applications are incorporated by reference herein in their entirety.

FIELD OF INVENTION

The invention relates to a method for operating a switched mode power supply as a flyback converter wherein, in a capture phase, magnetic energy is stored in the core of a transformer via a primary winding that is attached to an intermediate circuit voltage and wherein, in a subsequent release phase, most of the stored magnetic energy is delivered to a load via a secondary winding and a small part of the magnetic energy is delivered on the primary side. The invention further relates to an arrangement for carrying out the method.

BACKGROUND OF THE INVENTION

Switched mode power supplies are generally known. They include those which function according to the flow converter principle and those which function as flyback converters. In the case of the latter, magnetic energy is stored during a capture phase by means of a current which flows through the primary winding of a transformer. Said magnetic energy is delivered to a load, which is connected on a secondary side, during a subsequent release phase after rectification and smoothing. A switch element, which is connected in series with the primary winding of the transformer, is activated and deactivated by a control device depending on the load.

A switched mode power supply is normally used to connect a direct current load to an alternating current network. In this case, the switched mode power supply is connected to the alternating current network on the input side and, in a first step, a direct voltage is provided in an intermediate circuit by means of rectification and smoothing. If the switch element is activated, the intermediate circuit is then closed via the primary winding and a current flows which causes a magnetic flux in the core of the transformer. The electrical energy which is supplied in this capture phase is stored as magnetic energy in the core of the transformer. In this case, it is important to consider the so-called stray inductance of the transformer, which stray inductance cannot be used for the energy transfer. It represents the non-ideal coupling between primary and secondary winding. At the beginning of the release phase, i.e. when the switch element disconnects, the primary-side stray energy causes a high feedback voltage at the switch element, which can destroy the switch element. This behavior is critical above all in the case of powerful switched mode power supplies with large transformers. Here, the primary-side stray energy can no longer be simply thermally reduced in a snubber network, and instead the stray energy must be returned to the primary intermediate circuit, also for the purpose of increasing the efficiency.

In order to limit the feedback voltage, e.g. DE 35 37 536 A1 provides for the primary winding to include a tap which corresponds approximately to the maximal sampling ratio. The tap is connected to a capacitor, which is in turn connected to a reference potential via a diode. Each half-wave of the switched mode power supply is therefore clamped to zero or to a reference potential, such that no high feedback voltages can occur.

Young R.: "Stromversorgungen für SLICs", Telecomm & Elektronik, 2001, volume 1, pages 27-32, describes a solution for avoiding excessive feedback voltage by using a snubber circuit which is arranged between primary winding and switch element. In this case, part of the primary-side stray energy is expended over a snubber resistor and a snubber capacitor, in order thus to limit the maximal feedback voltage and to avoid damaging the switch element. However, the efficiency of the power supply is also decreased thus.

JP 11098832 describes a flyback converter comprising a snubber circuit with a capacitor, a diode and an auxiliary winding. Although the losses can be restricted here, they still cannot be ignored in the case of powerful switched mode power supplies.

According to the prior art, a primary-side discharge circuit is therefore provided for powerful switched mode power supplies. This discharge circuit has the effect that the primary-side stray energy can be returned to the intermediate circuit via a primary-side discharge winding, without overloading the switch element in this case. The discharge circuit includes a diode which prevents a reverse current flow during the capture phase.

Dixon L.: "Transformer and Inductor Design for Optimum Circuit Performance", Dallas, Tex., 2003, Texas Instruments Incorporated, pages 2-3 describes a method in which the primary winding is used as a discharge winding for returning the primary-side stray energy to the intermediate circuit. In the case of this arrangement (see also FIG. 1), the primary winding is attached by means of two additional interfaces to the intermediate circuit voltage and the reference potential of the intermediate circuit, wherein diodes which only allow a current return flow during the release phase are arranged in these interface connections. The connection of the primary winding to the intermediate circuit voltage and the reference potential during the capture phase is effected via two switch elements which are synchronously activated and deactivated by a controller.

U.S. Pat. No. 4,754,385 also describes such a circuit. In this case, a capacitor and parallel resistor are additionally connected in series with a diode. The capacitor buffers the backflow energy during the release phase in case the intermediate circuit voltage features a ripple wherein, during the lower ripple peaks, the intermediate circuit voltage drops below the voltage which is transferred from the secondary side to the primary side.

JP 60148374 A likewise describes a flyback converter with a primary winding which is additionally attached via diodes to the intermediate circuit voltage and the reference potential. In this case, a capacitor is provided in series with a diode, energy being buffered in said capacitor during short-term backflow phases.

A further known method for feedback of the primary-side stray energy into the intermediate circuit utilizes an additional primary-side auxiliary winding as a discharge winding. This auxiliary winding is wound close to the primary winding, wherein the winding direction is the same as that of the primary winding for optimal coupling, but the configuration is counter to the primary winding (see also FIG. 3). In the release phase, the primary-side stray energy is then returned into the intermediate circuit via the auxiliary winding and a diode.

In the case of switched mode power supplies, operating states can occur in which the input voltage and hence also the intermediate circuit voltage drop (e.g. in the event of a short-term power failure). In this case, the problem occurs that energy which could be utilized on the secondary side is returned to the intermediate circuit if the intermediate circuit voltage falls below the secondary voltage which has been transformed in the demagnetized winding in accordance with the turn ratio. In the case of lower input voltages, therefore, the prior art provides for utilizing a so-called power derating, irrespective of the thermal conditions. In this case, a lower power that can be unloaded is defined for smaller input voltages.

Generally limiting the function of a switched mode power supply to higher minimal input voltages is also known. The range including low input voltages is not fully utilized, therefore, since it can result in a rapid destruction of the discharge circuit.

SUMMARY OF INVENTION

The invention therefore addresses the problem of specifying an improvement over the prior art in relation to methods for operating a switched mode power supply of the type cited in the introduction.

According to the invention, this problem is solved by a method in accordance with the claims. In this case, the demagnetization does not take place directly in the intermediate circuit, but in a separate discharge circuit. In this case, the energy which is delivered on the primary side is used for charging a capacitor via a diode in a discharge circuit and thus maintaining the voltage in the discharge circuit above that in the intermediate circuit; and indeed this discharge circuit voltage which is present at the capacitor is maintained above a reference voltage, this being derived from the secondary voltage that has been transformed in accordance with the turn ratio. This has the advantage that, in the release phase, only the primary-side stray energy is carried away via the discharge circuit, even if the voltage in the intermediate circuit is lower than the transformed secondary voltage or the reference voltage. It is therefore possible to operate a switched mode power supply even in the case of low intermediate circuit voltages, and to make a possible power derating dependent solely on the remaining thermal conditions in the switched mode power supply. The usable input voltage range is therefore increased. Furthermore, better utilization of the energy stored in intermediate circuit capacitors is achieved, thereby providing a considerably longer buffer time in the event of a power failure. A smaller and hence cheaper electrolytic capacitor can be arranged in the intermediate circuit for an equivalent buffer time accordingly, resulting in a decrease in the manufacturing costs and a reduction in the size.

A further advantage over the prior art is that, in the case of low input voltages, the components via which the primary-side stray energy is returned are not exposed to any additional load from parts of the energy which is available on the secondary side. The components can therefore have smaller dimensions, again resulting in a reduction in the costs and size.

Moreover, the efficiency of the switched mode power supply increases in the case of lower input voltages, and the invention provides greater degrees of freedom for the dimensioning of the turn ratio of the transformer.

In an advantageous variant of the invention, the stray energy which is delivered on the primary side charges the capacitor via a primary-side auxiliary winding and a diode. In the release phase, the primary-side stray energy is therefore returned into the discharge circuit via an additional auxiliary winding which is wound close to the primary winding. In this case, for example, the auxiliary winding has the same number of turns as the primary winding. At the instant the switch element is disconnected, the intermediate circuit voltage (e.g. 300 V) is present at the primary winding. As a result of the return of the primary-side stray energy, a voltage is simultaneously induced in the auxiliary winding, wherein said voltage corresponds to the intermediate circuit voltage (e.g. 300 V) if the primary and auxiliary windings have the same number of turns. These voltages are then added at the switch element, as a result of which this feedback voltage at the switch element corresponds maximally to twice the intermediate circuit voltage. Therefore, moreover, the switch element does not need to be designed for higher voltages.

In a further advantageous variant of the invention, provision is made for the energy which is delivered on the primary side to charge the capacitor via the primary winding and a diode. In this case, the corresponding arrangement comprises two synchronously connected switch elements wherein, in the case of disconnected switch elements, the return of the primary-side stray energy takes place via additional intermediate circuit interfaces of the primary winding. This type of return is particularly advantageous for switched mode power supplies having high intermediate circuit voltages, since the voltage at the switch elements only corresponds to the simple intermediate circuit voltage at the instant of the disconnection. It is therefore possible to use two switch elements which are only designed for a maximal intermediate circuit voltage. These two switch elements are generally cheaper in the case of high voltages than a switch element which would have to be designed for twice the intermediate circuit voltage.

It is also advantageous if the voltage of the capacitor is compared, in a regulator, with a defined maximal voltage which is slightly higher than secondary voltage which has been transformed with the turn ratio. When the maximal voltage is reached on the discharge circuit, a connection is made between discharge circuit and intermediate circuit, and the energy which is delivered on the primary side via the discharge circuit is supplied directly to the intermediate circuit. It is therefore ensured that the voltage in the discharge circuit is always higher than the secondary voltage which has been transformed with the turn ratio. As a result, the capacitor in the discharge circuit is not charged to an unnecessarily high level.

Part of the energy which is temporarily stored in the discharge circuit is naturally converted into heat. However, this dissipated heat is considerably less than the dissipated heat occurring in the known methods. The use of a cooled regulator gives the advantage that, even in the case of more powerful switched mode power supplies, it is possible to work for an extended period using lower input voltages.

An advantageous arrangement for carrying out the method provides for a capacitor to be arranged in a manner whereby it is charged, by the energy which is delivered on the primary side, such that the voltage present at said capacitor is always higher than the voltage present on the secondary side times the transfer ratio of the transformer.

For the return of the primary-side stray energy via the primary winding, the primary winding features a first winding interface which is attached to the intermediate circuit voltage via a switch element and is connected to a reference potential via a diode. The primary winding features a second winding interface which is attached to the reference potential via a further switch element and to the intermediate circuit voltage via a further diode. The energy which is delivered on the primary side then charges the capacitor via one of the diodes.

A further advantageous arrangement provides for a primary-side auxiliary winding to be arranged such that the energy which is delivered on the primary side charges the capacitor via a diode via said auxiliary winding. In this case, the auxiliary winding, the diode and the capacitor are connected in series in the closed discharge circuit. The interfaces, by means of which the discharge circuit is connected to the intermediate circuit via the regulator, are located between diode and capacitor and between capacitor and auxiliary winding.

In order to limit the voltage in the discharge circuit, it is advantageous if provision is made for a regulator on the primary side, via which an interface of the capacitor is connected to the intermediate circuit. In this case, the regulator can be implemented as an in-phase regulator or also as a switching regulator, and can easily be dimensioned such that a desired minimal countervoltage is achieved at any time in the discharge circuit.

BRIEF DESCRIPTION OF THE DRAWINGS

The invention is described below with reference to the appended figures, providing schematic illustrations in which:

FIG. 3 shows a switched mode power supply with a discharge or auxiliary winding in accordance with the prior art, FIG. 4 shows an inventive switched mode power supply with a discharge or auxiliary winding and a regulator attached on the voltage side.

DETAILED DESCRIPTION OF INVENTION

Figure 1:
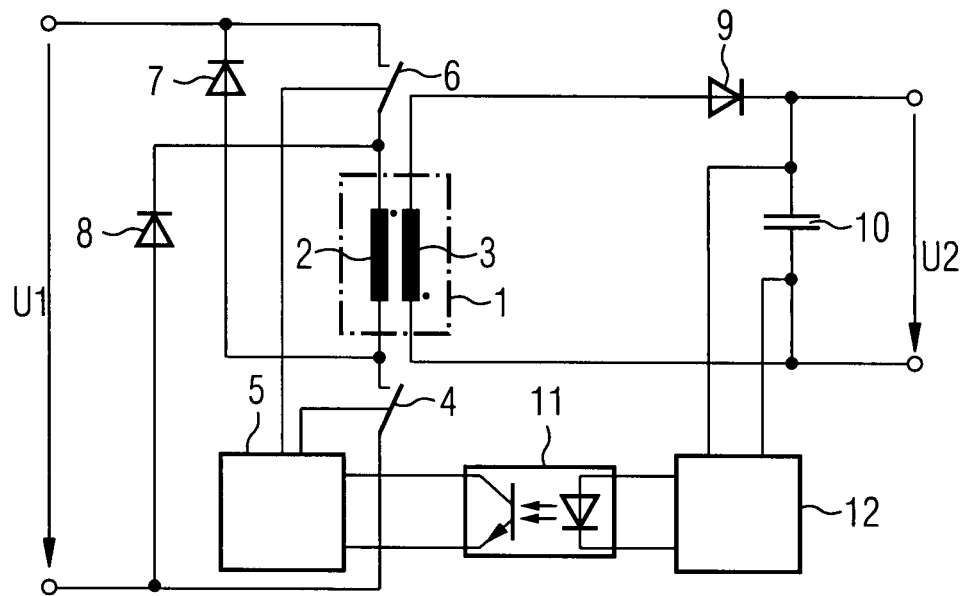
FIG. 1 shows a switched mode power supply with return of the stray energy via the primary winding in accordance with the prior art.

FIG. 1 shows a switched mode power supply as a flyback converter in simplified form. In this case, the transformer 1 features a primary winding 2 and a secondary winding 3, these being wound in a diametrically opposite manner. On the secondary side, the output voltage U2 is available following rectification by means of a rectifying diode 9 and a smoothing capacitor 10. Attached to this output voltage U2 is an output voltage regulator 12 which transfers an actuating signal via an optocoupler 11 to a controller 5 for load-dependent activation and deactivation of the two switch elements 4 and 6. This controller 5 generally works using pulse-width modulation (PWM) in this case, wherein the power which is transferred via the transformer 1 is determined by the length of the activation times in the context of a clock frequency which normally remains the same. In this case, the clock frequency is significantly higher than the mains frequency.

The winding interfaces of the primary winding 2 are connected in parallel with the switch elements 4 and 6 via diodes 7 and 8 to interfaces of the intermediate circuit voltage U1 or the reference potential of the intermediate circuit. In this case, the diodes 7 and 8 determine the current flow in the intermediate circuit such that, in the case of activated switch elements 4 and 6, a current which is caused by the intermediate circuit voltage U1 flows through the primary winding 2 and, in the case of deactivated switch elements 4 and 6, a current which is caused by the primary-side stray energy flows back via the diodes into the intermediate circuit. If the intermediate circuit voltage U2 now falls below the secondary voltage which is transformed with the transfer ratio of the transformer 1, part of the energy which is available on the secondary side is also erroneously returned into the intermediate circuit in addition to the primary-side stray energy during the release phase if the switch elements 4 and 6 are disconnected.

Figure 2:
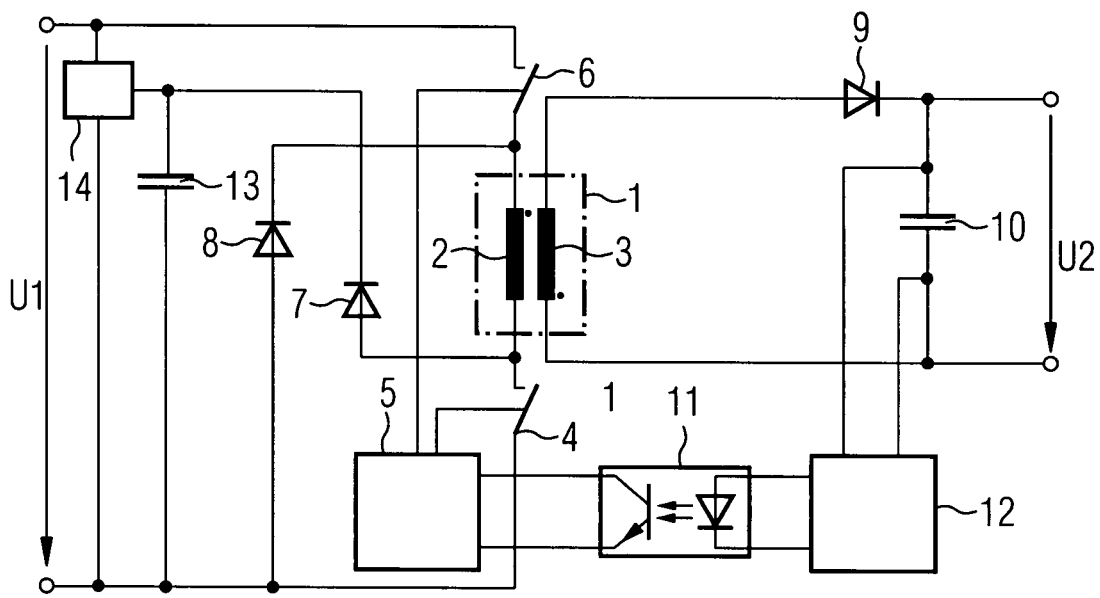
FIG. 2 shows an inventive switched mode power supply with return of the stray energy via the primary winding.

This erroneous return is prevented by the variant of the invention as illustrated in FIG. 2. In this case, the arrangement corresponds to that illustrated in FIG. 1, with the exception of a return branch by means of which a winding interface of the primary winding 2 is connected to a regulator 14 via a diode 7. In this case, the anode of the diode 7 is connected to the winding interface and the cathode of the diode 7 is connected to the regulator 14 and also to a first interface of a capacitor 13. The second interface of the capacitor 13 is connected to the reference potential of the intermediate circuit. With each clock cycle of the switched mode power supply, the primary-side stray energy from the transformer 1 charges the capacitor 13 via the diode 7 during the release phase if the switch elements 4 and 6 are disconnected. The voltage at the capacitor 13 therefore increases. As soon as the voltage at the capacitor 13 is greater than a predetermined reference voltage, the regulator 14 switches through and discharges the capacitor 13 into the intermediate circuit until the voltage at the capacitor 13 is smaller then the reference voltage again.

This reference voltage can be defined in this case as a minimal countervoltage in the discharge circuit, wherein this can be predetermined easily using a Z-diode having a corresponding breakdown voltage.

FIG. 3 shows a switched mode power supply with an auxiliary winding for return of the primary-side stray energy in accordance with the prior art. In this case, the secondary side corresponds to the illustrations in the FIGS. 1 and 2. On the primary side, however, only a switch element 4 is arranged in series with the primary winding 2. This switch element 4 is again activated and deactivated via a controller 5.

An auxiliary winding 15 is arranged close to the primary winding 2 in the transformer 1, and is actually used like the secondary winding 3 as a flyback converter winding. The number of turns in the primary winding 2 and the auxiliary winding 15 is typically identical in this case, but can also be different if desired. The auxiliary winding 15 is connected via a diode 7 to the intermediate circuit voltage by means of one winding interface, and to the reference potential of the intermediate circuit by means of the second winding interface. The diode 7 prevents a current flow through the auxiliary winding 15 during the capture phase; only after the disconnection of the switch element 4 does the voltage direction reverse as a result of the return of the primary-side stray energy, such that current can flow via the diode 7 into the intermediate circuit. If the intermediate circuit voltage U1 falls below the secondary voltage which has been transformed with the transfer ratio of the transformer 1, the problem again occurs that part of the energy which is available on the secondary side is also erroneously returned into. the intermediate circuit in addition to the primary-side stray energy.

FIG. 4 illustrates a solution according to the invention, which prevents the erroneous return for switched mode power supplies having an auxiliary winding 15. As far as the interface of the auxiliary winding 15 to the intermediate circuit voltage U1, the arrangement corresponds to that illustrated in FIG. 3. The auxiliary winding 15 is again arranged close to the primary winding 2, being diametrically opposed to this and having the same number of windings. The auxiliary winding 15 is connected by means of one interface to the reference potential of the intermediate circuit, the second interface of the auxiliary winding 15 is connected via a diode 7 to a regulator 14. A capacitor 13 is arranged in parallel with the serial connection comprising auxiliary winding 15 and diode 7. In this case, the functionality again corresponds to that described in FIG. 2, with the exception here that, with each clock cycle, the primary-side stray energy is fed via the auxiliary winding 15 into the discharge circuit comprising auxiliary winding 15, diode 7 and capacitor 13.

Figure 5:
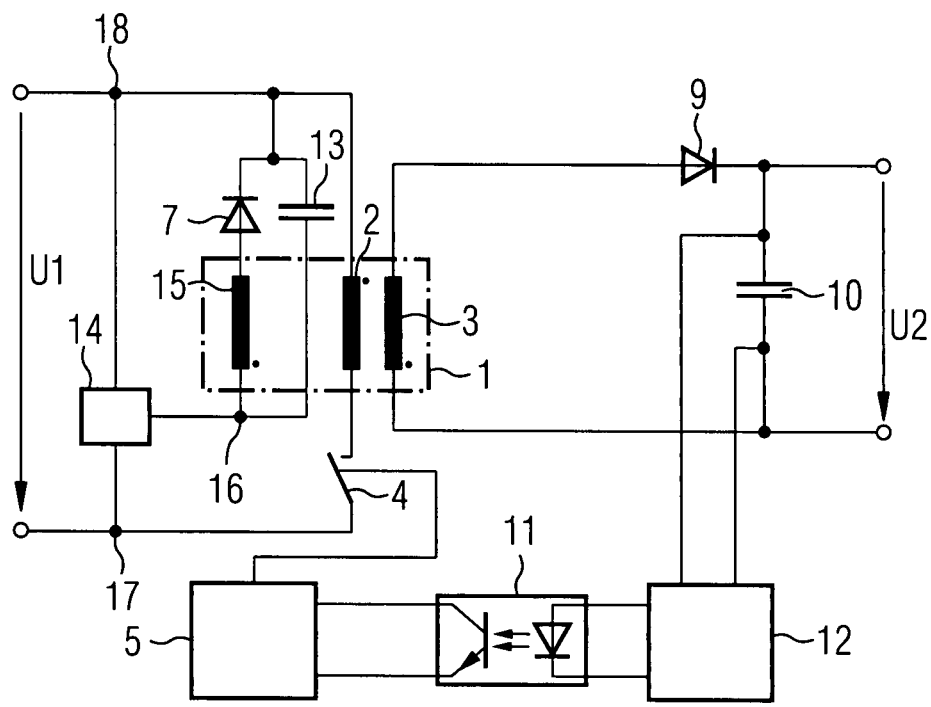
FIG. 5 shows an inventive switched mode power supply with an auxiliary winding and a regulator attached on the ground side.

The arrangement illustrated in FIG. 5 corresponds essentially to that illustrated in FIG. 4, with the difference that the regulator 14 connects the intermediate circuit and the discharge circuit on the ground side here instead of on the voltage side. The minimal countervoltage required in the discharge circuit is then specified as a reference voltage in the regulator (e.g. as a Z-diode voltage).

Figure 6:
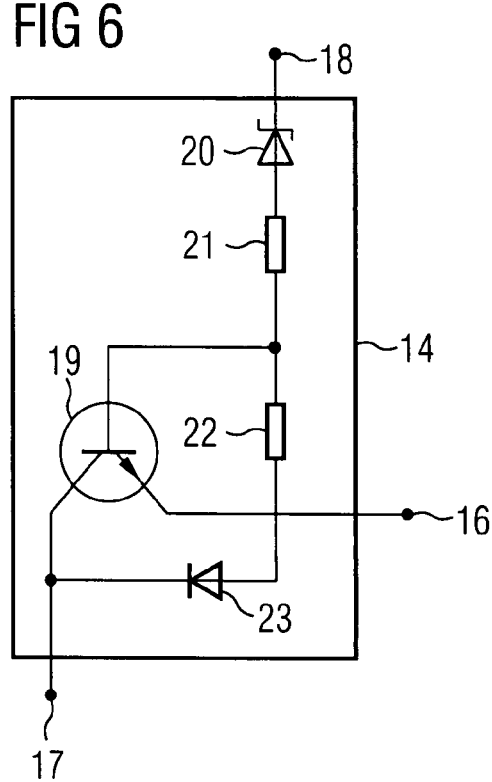
FIG. 6 shows a regulator with transistor and diode.

FIG. 6 shows a variant of the regulator 14 as per the arrangement illustrated in FIG. 5, within the circuit having the three interfaces 16, 17 and 18. The regulator is attached to the intermediate circuit voltage U1 by means of the first interface 18, wherein a Z-diode 20, two resistors 21 and 22 and a diode 23 are arranged in series leading from this interface 18 to the interface 17, by means of which the regulator 14 is connected to the reference potential of the intermediate circuit. An interface 16 branches off between the second resistor 22 and the diode 23, and provides the connection of the regulator 14 to the reference potential of the discharge circuit. Within the regulator 14, provision is further made for a transistor 19 whose base is connected to a branch between the resistors 21 and 22. The emitter of the transistor 19 is attached to the reference potential of the discharge circuit and the collector is connected to the reference potential of the intermediate circuit.

The actual regulator function is satisfied by the Z-diode 20 as a reference element and by the transistor 19 for switching the capacitor 13 through to the intermediate circuit. The resistors 21 and 22 are used as protective elements and for adjusting the transistors 19 and improving the performance of the regulator. The diode 23 is provided for the standard case, in which the intermediate circuit voltage U1 is higher than the discharge voltage. A current which is caused by the intermediate circuit voltage U1 then charges the capacitor 13 via the diode 23. In this case, the performance is exactly the same as if the primary-side stray energy is returned directly to the intermediate circuit.

Figure 7:
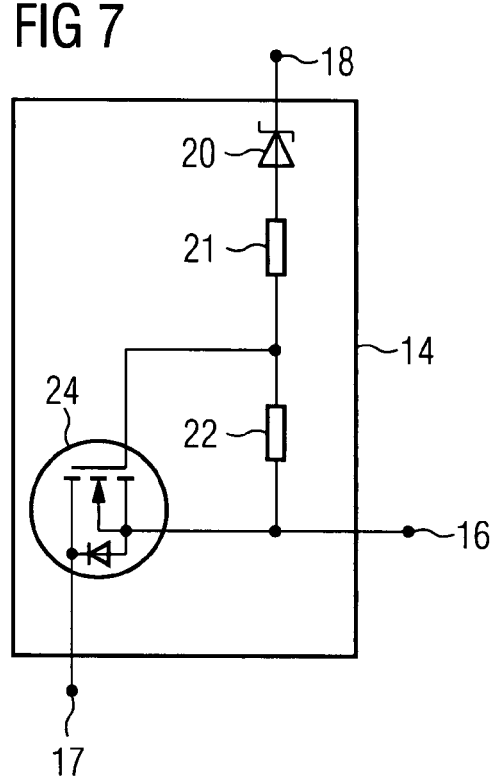
FIG. 7 shows a regulator with FET.

The regulator 14 is also illustrated in FIG. 7, wherein the transistor 19 and the diode 23 are replaced here by a field effect transistor (FET) 24. In this case, the operation corresponds to the regulator 14 as illustrated in FIG. 6, since the diode 23 is already integrated in the FET by virtue of the technology.

The invention claimed is:

1. A method for operating a switched mode power supply as a flyback converter, comprising:
    storing magnetic energy during a capture phase in a transformer core via a primary winding attached to an intermediate circuit voltage; and
    delivering substantially all of the stored magnetic energy during a subsequent release phase to a load via a secondary winding and a smaller portion than substantially all of the magnetic energy is delivered on the primary side, wherein the energy delivered on the primary side leads to a first capacitor interface and charges the capacitor, and wherein a second capacitor interface is connected to a reference potential of the intermediate circuit such that the voltage of the capacitor is always greater than the voltage present on the secondary side by a factor equal to the transfer ratio of the transformer.

2. The method as claimed in claim 1, wherein the energy delivered on the primary side charges the capacitor via a primary-side auxiliary winding and a diode.

3. The method as claimed in claim 1, wherein the energy delivered on the primary side charges the capacitor via the primary winding and a diode.

4. The method as claimed in claim 3, wherein the voltage of the capacitor is compared via a regulator with a defined maximal voltage and when the maximal voltage is reached, the energy delivered on the primary side is supplied directly to the intermediate circuit.

5. An arrangement for operating a switched mode power supply as a flyback converter, comprising:
    a transformer that, during a capture phase, stores magnetic energy in a core of the transformer via a primary winding attached to an intermediate circuit voltage;
    a secondary winding that, during a subsequent release phase, delivers substantially all of the stored magnetic energy of the transformer core;
    a primary side that delivers a smaller portion than substantially all of the stored magnetic energy; and
    a discharge circuit comprising a source for the energy delivered on the primary side and a capacitor electrically connected via a first interface to the primary side so as to be charged by the energy delivered on the primary side, and electrically connected on a second interface to a reference potential of the intermediate circuit, such that the voltage present at the capacitor is always greater than the voltage present on the secondary side by a factor equal to the transfer ratio of the transformer, and such that during the release phase the capacitor energizes the discharge circuit without regard for an intermediate circuit voltage.

6. The arrangement as claimed in claim 5, wherein the primary winding features:
    a first winding interface which is attached to the intermediate circuit voltage via a switch element and connected to a reference potential via a diode,
    a second winding interface which is attached to the reference potential via a further switch element and connected to the intermediate circuit voltage via a further diode, and that the energy which is delivered on the primary side charges the capacitor via one of the diodes.

7. The arrangement as claimed in claim 5, wherein a primary-side auxiliary winding is arranged such that the energy delivered on the primary side charges the capacitor via a diode via the auxiliary winding.

8. The arrangement as claimed in claims 7, further comprising a regulator arranged on the primary side via which an interface of the capacitor is connected to the intermediate circuit.

9. An arrangement for operating a switched mode power supply as a flyback converter, comprising:
    a transformer that, during a capture phase, stores magnetic energy in a core of the transformer via a primary winding attached to an intermediate circuit voltage;
    a secondary winding that, during a subsequent release phase, delivers substantially all of the stored magnetic energy of the transformer core;
    a primary side that delivers a smaller portion than substantially all of the stored magnetic energy; and
    a discharge circuit comprising a source for the energy delivered on the primary side and a capacitor electrically connected via a first interface to the primary side so as to be charged by the energy delivered on the primary side, and electrically connected on a second interface to a reference potential of the intermediate circuit, such that the voltage present at the capacitor is always greater than the voltage present on the secondary side by a factor equal to the transfer ratio of the transformer, and such that during the release phase the capacitor energizes the discharge circuit without regard for an intermediate circuit voltage.

\* \* \* \* \*